United States Patent
Keuffer et al.

(10) Patent No.: US 10,437,915 B2
(45) Date of Patent: Oct. 8, 2019

(54) METHODS FOR REDACTING AN ORIGINAL DOCUMENT OR VERIFYING THE AUTHENTICITY OF A FINAL DOCUMENT

(71) Applicant: IDEMIA IDENTITY & SECURITY FRANCE, Issy-les-Moulineaux (FR)

(72) Inventors: Julien Paul Keuffer, Issy-les-Moulineaux (FR); Herve Chabanne, Issy-les-Moulineaux (FR); Rodolphe Hugel, Issy-les-Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 0 days.

(21) Appl. No.: 15/824,953

(22) Filed: Nov. 28, 2017

(65) Prior Publication Data
US 2018/0150440 A1     May 31, 2018

(30) Foreign Application Priority Data
Nov. 29, 2016  (FR) ..................... 16 61647

(51) Int. Cl.
| | |
|---|---|
| *G06F 17/21* | (2006.01) |
| *G06F 3/0484* | (2013.01) |
| *G06F 17/24* | (2006.01) |
| *G06F 21/62* | (2013.01) |

(Continued)

(52) U.S. Cl.
CPC ........ *G06F 17/218* (2013.01); *G06F 3/04842* (2013.01); *G06F 3/04845* (2013.01);
(Continued)

(58) Field of Classification Search
CPC .. G06F 17/218; G06F 17/242; G06F 21/6245; G06F 21/6254; G06F 3/04842; G06F 3/04845; H04L 63/04; H04L 63/12; H04L 2209/04; H04L 2209/16; H04L 2209/42
See application file for complete search history.

(56) References Cited

U.S. PATENT DOCUMENTS
7,802,305 B1   9/2010 Leeds

OTHER PUBLICATIONS

Preliminary Research Report received for French Application No. 1661647, dated Jul. 6, 2017, 3 pages (1 page of French Translation Cover Sheet and 2 pages of original document).
(Continued)

*Primary Examiner* — Edward Park
(74) *Attorney, Agent, or Firm* — Womble Bond Dickinson (US) LLP

(57) ABSTRACT

The present invention concerns a method for redacting an original document consisting of a matrix of pixels each defined by a vector having at least one numerical value, the method comprising implementation by data processing means (11) of equipment (1), of steps of:
(a) Determining a set of pixels of said matrix corresponding to one or more areas to be blacked-out from the original document;
(b) Generating a final document corresponding to the original document in which the vectors defining the pixels of said selected set are replaced by an arbitrary vector;
(c) Generating a zero-knowledge proof of the fact that the pixel matrixes of the original document and of the final document only differ via pixels belonging to said selected set.

The present invention also concerns a method for verifying the authenticity of a final document.

14 Claims, 1 Drawing Sheet

(51) Int. Cl.
*H04L 29/06* (2006.01)
*H04W 12/02* (2009.01)

(52) U.S. Cl.
CPC ........ *G06F 17/242* (2013.01); *G06F 21/6245* (2013.01); *G06F 21/6254* (2013.01); *H04L 63/04* (2013.01); *H04L 63/12* (2013.01); *H04W 12/02* (2013.01); *H04L 2209/04* (2013.01); *H04L 2209/16* (2013.01); *H04L 2209/42* (2013.01)

(56) References Cited

OTHER PUBLICATIONS

Parno et al., "Pinocchio: Nearly Practical Verifiable Computation", IEEE Symposium on Security and Privacy (SP), May 19-22, 2013, pp. 238-252.

Naveh et al., "PhotoProof: Cryptographic Image Authentication for Any Set of Permissible Transformations", IEEE Symposium on : Security and Privacy (SP), May 22-26, 2016, pp. 255-271.

European Search Report received for EP Patent Application No. 17306657, dated Jan. 10, 2018, 2 pages.

Costello et al., "Geppetto: Versatile Verifiable Computation", IEEE Symposium on Security and Privacy (SP), May 17-21, 2015, pp. 253-270.

Ben-Sasson et al., "SNARKs for C: Verifying Program Executions Succinctly and in Zero Knowledge", In Proceedings of the 33rd Annual International Cryptology Conference, CRYPTO '13, 2013, pp. 90-108.

Ben-Sasson et al., "Scalable Zero Knowledge Via Cycles of Elliptic Curves", Algorithmica, Network and Parallel Computing, Lecture Notes in Computer Science, Lect. Notes Computer, Part II, vol. 8617, 2014, pp. 276-294.

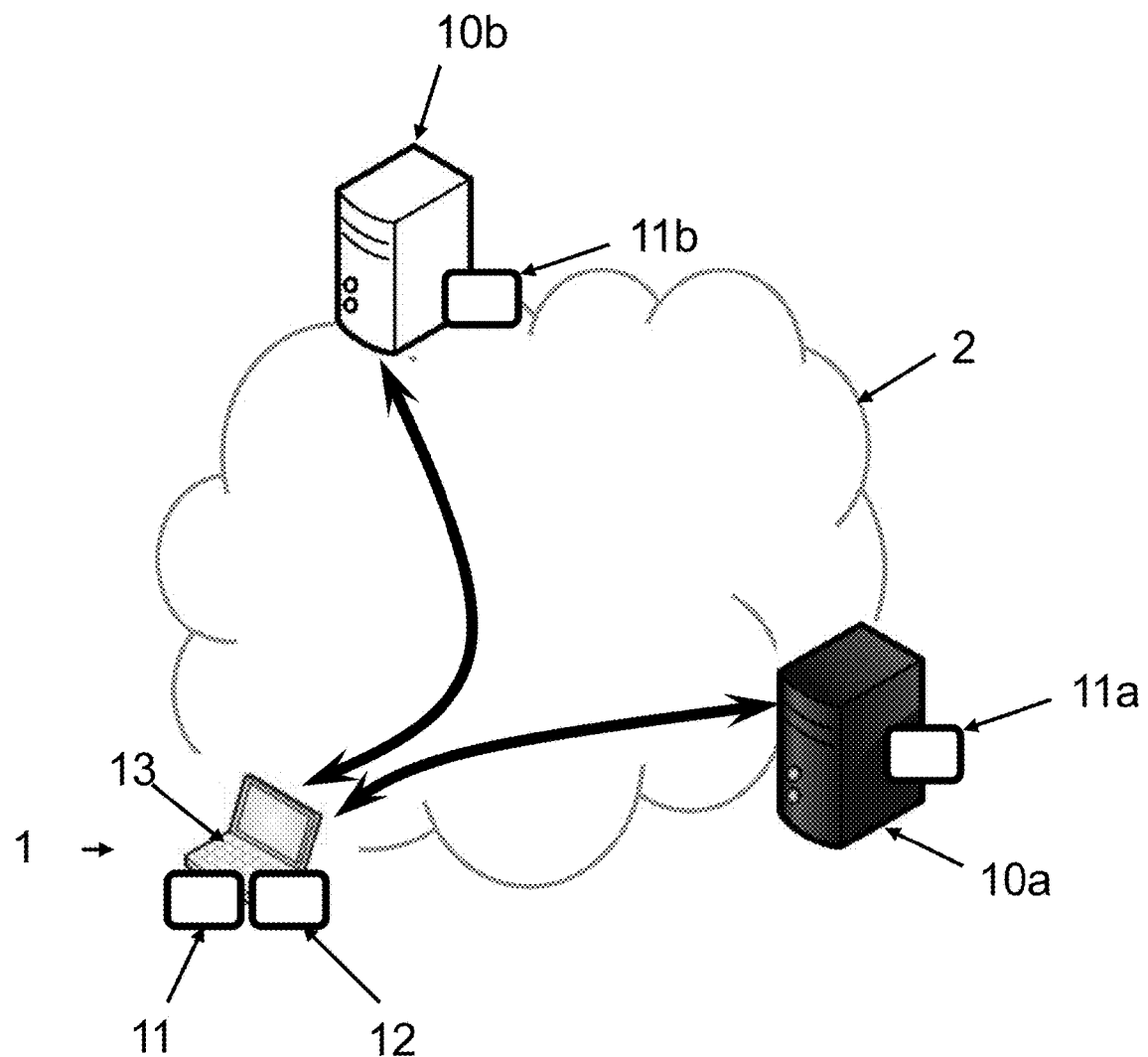

METHODS FOR REDACTING AN ORIGINAL DOCUMENT OR VERIFYING THE AUTHENTICITY OF A FINAL DOCUMENT

GENERAL TECHNICAL FIELD

The present invention relates to the field of authentication, and in particular to a secure method for redacting a document.

STATE OF THE ART

It is frequently required to submit supporting documents to authorities such as an electricity bill (proof of residence), a salary slip (proof of work), a bank statement (proof of income) for some everyday administrative procedures.

These documents provide proof that is considered to be valid since the issuer is assumed to be trustworthy.

However, it is ascertained that they may also reveal sensitive information that the user does not wish to disclose. For example, an electricity bill indicates the name of the spouse whereas solely the address is of importance, a salary slip gives the salary paid whereas only the name of the company is of importance, and a bank statement shows all transactions made whereas only the balance is of importance.

It is tempting to wish to alter the document to hide this information, in particular by blacking-out the associated areas. This is known as "redacting" a document (this term is typically used for confidential documents disclosed to the public e.g. during a court case).

Yet, if this is carried out by the user or by a third party other than the issuer of the document, doubt may be cast on the validity of the document or on the fact that only the blacked-out parts have been modified: for example, the name of the spouse may be masked but perhaps also the name of the person originally indicated on the bill for the purpose of obtaining a false address.

A means must therefore be found to continue guaranteeing the authenticity of the original document, whilst only submitting the modified document.

A project is known for securing administrative documents to prevent usurpation of identity or fraud, initiated by the French national secure credentials agency (Agence Nationale des Titres Sécurisés—ANTS) and called 2D-Doc (https://ants.gouv.fr/Les-solutions/2D-Doc).

Under this project, a 2D barcode is inserted in a document to be used by the administration, this barcode certifies the integrity and authenticity of the document. It contains various data on the document (content, issuer, issue date thereof, etc.). These data are then condensed into a condensate guaranteeing the integrity thereof and are digitally signed by the issuer of the document which guarantees the authenticity thereof. The State holds a list of recognized issuers for whom the authenticity of the signature can be verified.

With the 2D-Doc solution, it is possible to guarantee the authenticity and integrity of a document, and even if not already planned, it can be contemplated to provide for the requesting of certain modifications to preserve personal privacy at the time of issue of the document (before the generation and affixing of the barcode). Any subsequent modification of the document will render the signature invalid (since it would no longer correspond to the document).

This would make it possible to solve the problem to a certain extent, but it would be scarcely practical since any subsequent modification would remain impossible.

It is to be noted that so-called robust hashing functions are known i.e. which give a result that is close (over a certain distance) to the condensate of the original document if a defined transformation was applied to this document. A condensate of the original document is received together with the signature of this condensate and the modified condensate. The verification consists in validating the signature of the received condensate, computing the condensate of the modified document and verifying that this condensate of the modified document is sufficiently close to the condensate of the original document. Use could be made thereof to improve the 2D barcode.

However, these functions have non-negligible false-acceptance rates insofar as they are constructed to accept transformations which do not allow the blacking-out of a given area. Therefore, not only does blacking-out not consist of a transformation which would give a sufficiently close condensate, but more especially other truly fraudulent transformations could be accepted as being legitimate since they would give a condensate that is sufficiently close to the original condensate.

It would therefore be desirable to have available a novel method for verifiable removal of sensitive information from administrative documents, that is reliable (impossible to carry out modifications of a type to falsify a document), efficient (little time and computing power needed both to remove sensitive information and to verify the authenticity of the document thus modified) and user-friendly (possible removal of information as many times as wished and when wished).

PRESENTATION OF THE INVENTION

In a first aspect, the present invention relates to a method for redacting an original document consisting of a matrix of pixels each defined by a vector having at least one numerical value, the method comprising implementation by data processing means of equipment, of steps of:
(a) Determining a set of pixels of said matrix corresponding to one or more areas to be blacked-out from the original document;
(b) Generating a final document corresponding to the original document in which the vectors defining the pixels of said selected set are replaced by an arbitrary vector;
(c) generating a zero-knowledge proof of the fact that the pixel matrixes of the original document and of the final document only differ via pixels belonging to said selected set.
According to other nonlimiting advantageous features:
the original document is associated with a condensate obtained by a given hashing function, said zero-knowledge proof generated at step (c) also being proof of the fact that said condensate is indeed the result of application of said given hashing function to the original document;
the original document and said condensate are provided by an issuing body, the method further comprising prior verification, by said data processing means, that said condensate is indeed the result of application of said given hashing function to the original document;
said condensate is signed by said issuing body;
step (a) comprises the prior definition of each area to be blacked-out from the original document in the form of a planar geometric figure, said set of pixels corresponding to one or more areas to be blacked-out from the original document being determined as the set of pixels of the matrix included in at least one of said planar geometric shapes;

said planar geometric shapes are rectangles each defined by four parameters;

at least one rectangle defining an area to be blacked-out from the original document is directly selected by the user by means of an interface of the equipment, step (a) comprising the determination of the values of said four parameters defining the selected rectangle;

a chain of characters to be blacked-out from the original document is selected by the user by means of an interface of the equipment, step (a) comprising the determination of the values of said four parameters of the rectangle(s) of the image required to cover said selected chain of characters;

the zero-knowledge proof generated at step (c) is a cryptographic object of zk-SNARK type;

said given hashing function is a hashing function based on the subset sum allowing preservation of the efficacy of proof generation.

In a second aspect, the invention concerns a method for verifying the authenticity of a final document obtained by implementing on an original document a redacting method according to the first aspect, the final document being associated with said zero-knowledge of the fact that the pixel matrixes of the original document and of the final document only differ via pixels belonging to said selected set, the method comprising the implementation, by data processing means of a server, of a step to verify that said zero-knowledge proof is valid.

According to other advantageous, nonlimiting features:

the final document is further associated with a condensate of the original document obtained by a given hashing function, said zero-knowledge proof also being proof of the fact that said condensate is indeed the result of application of said given hashing function to the original document;

said condensate is signed by an issuing body of the original document, the method further comprising a step to verify the validity of said signature.

In a third and a fourth aspect, the invention proposes a computer program product comprising code instructions to execute a method according to the first or second aspect for redacting an original document or verifying the authenticity of a final document; and storage means readable by computer equipment on which a computer program product comprises code instructions to execute a method according to the first or second aspects for redacting an original document or verifying the authenticity of a final document.

PRESENTATION OF THE FIGURES

Other features and advantages of the present invention will become apparent on reading the following description of a preferred embodiment. This description is given with reference to appended FIG. 1 giving a schematic of an architecture for implementing methods of the invention.

DETAILED DESCRIPTION

Architecture

With reference to FIG. 1, a method is proposed for redacting an original document, implemented within an architecture such as illustrated. In a second aspect, a method will be described for verifying the authenticity of a document thus redacted that in the present description shall be designated as a final document.

By "redacting" is meant the conventional definition of this term, i.e. blacking-out parts, namely the removal of information considered to be sensitive from the document, typically by blackening. Redacting only reduces the amount of information contained in the document, it does not add or modify any information. This means that the document is not falsified.

The present method is essentially implemented via equipment 1 equipped with data processing means 11 (one or more processors), typically a user's personal work station. The equipment 1 may further comprise data storage means 12 (a memory) to store original/final documents, and a user interface 3 (screen, keyboard, mouse, etc.). It will be understood that it is fully possible that the equipment 1 may be a server of a trustworthy third party that the user remotely accesses via a terminal (e.g. via a smartphone). The equipment 1, as explained below, acts as "prover".

The equipment 1 may be connected in particular via a network 2 such as the Internet to a first server 10a providing said original document. The first server 10a is therefore typically that of an issuing body (e.g. the server of a bank if the original document is a bank statement). As will be seen, preferably the issuing body also provides the equipment 1 with a condensate of the original document, also called a "cryptographic imprint" or "hash", generated by data processing means 11a of the first server 10a by applying a given hashing function to the original document. More preferably, said condensate is signed by the issuing body to guarantee the authenticity thereof.

When the original document and said condensate are provided by an issuing body, the method preferably further comprises prior verification by said data processing means 11 that said condensate is indeed the result of application of said given hashing function to the original document.

As illustrated in FIG. 1, the equipment 1 may also be connected (again via network 2) to a second server 10b which is typically the server of a body requesting the document as documentary evidence (e.g. the server of a Town-Hall), this second server 10b possibly being led to implementing the method to verify the authenticity of a final document redacted by equipment 1, using its own data processing means 11b. The server 10b, as is explained below, will play the role of "verifier".

Redacting Method

The present redacting method is implemented by data processing means 11 of equipment 1 on the original document, either received from the first server 10a or directly loaded by the user.

For the present method, it is considered that the original document consists of a matrix of pixels, each defined by a vector having at least one numerical value i.e. the document is represented by a matrix image (bitmap), as opposed to vector images. It is to be noted that a paper document is scanned in the form of a matrix image when scanned by a scanner.

Preferably, the image is in black and white (grey shades), each component of the matrix is a vector of dimension 1, i.e. it has a numerical value of between 0 and 255, 0 being a black pixel and 255 being a white pixel. For a color image, the example is taken of a vector of dimension 3 of RGB type (the three numerical values respectively represent the shades of red, green and blue of the pixel between 0 and 255). It will be understood that persons skilled in the art are not limited to these representations of an image.

In the remainder of the present description, the example is taken of an original document with grey shades (each pixel is represented by only one numerical value).

The present method sets out to obtaining "verifiable" redacting of the document i.e. whereby it can be proved a posteriori (in particular by the second server 10b) that there has not been any falsification, that the removal of sensitive information has had no effect other than removing information.

For this purpose, a cryptographic protocol is used generating "proof" of the authenticity of the final document.

The Pinocchio protocol presented in the publication: "Bryan Parno, Craig Gentry, Jon Howell and Mariana Raykova, Pinocchio: Nearly Practical Verifiable Computation, in Proceedings of the IEEE Symposium on Security and Privacy, IEEE, 21 May 2013" was one of the first verifiable computing protocols allowing the performer to compute the application of any function in verifiable manner and the order-giver to verify the associated proof in a computing time shorter than the time needed to perform the computation itself.

One application of the Pinocchio protocol is given by the PhotoProof protocol, presented in the publication: "Assa Naveh, Eran Tromer, PhotoProof: cryptographic image authentication for any set of permissible transformations, proc. IEEE Symposium on Security & Privacy (Oakland) 2016, 255-271, IEEE, 2016" which allows proof to be provided that an image from a camera has only been modified according to a set of predefined admissible transformations.

However, this method has the major drawback of requiring heavy computing power on the performer side. The cost of production of the proof of computation with this protocol is higher by a few orders of magnitude than required for the computation itself.

This protocol therefore appears to be extremely cumbersome and fully unsuitable for the present redacting method, since even if the time to verify proof of authenticity of an image is only 0.5 seconds, to generate the proof of authenticity of a photograph of 128×128 pixel size (by comparison an A4 document used as documentary evidence generally has a size of 740×500 even more than 1000×700 pixels) with 5 admissible transformations requires 300 seconds, and the key used to perform the proof is more than 2 Go.

The present method overcomes these difficulties, as will be seen, by allowing the generation of numerical proof of constant small size (less than 500 octets, i.e. 4 million times less than with PhotoProof) within a few seconds, and without revealing anything about the removed sensitive information.

At a first step (a), the data processing means 11 determine a set of pixels of said matrix corresponding to one or more areas to be blacked-out from the original document.

More specifically, via the interface 13, the user selects one or more areas to be blacked-out from the original documents, and the processing means 11 consequently determine the corresponding set of pixels of the matrix.

Persons skilled in the art are able to use one of the numerous algorithms to select part of a matrix image, but advantageously (for maximum efficiency of the method), each area is defined in the form of a planar geometric figure selected for example from a list of predetermined figures (polygons, ellipses, etc.), positioned for example using a drawing tool. Said set of pixels corresponding to one or more areas to be blacked-out from the original document is then determined as the set of pixels of the matrix included in at least one of said planar geometric shapes.

Preferably, insofar as each area to be blacked-out is theoretically a text, the planar geometric figure is a rectangle (of customizable dimensions).

Any rectangle is effectively defined by only four parameters (either the coordinates of two opposite angles, or the coordinates of one angle, a width parameter and length parameter).

Mathematically, if the image consists of a matrix of n*m pixels (i.e. image I=$\{P_{i,j}\}_{i\in[1;n],j\in[1;m]}$ ), and if it is provided that a rectangle is defined by the coordinates of the top left and bottom right angles (respectively denoted $x_1,y_1,x_2,y_2$ with $1 \leq x_1 < x_2 \leq n$, $1 \leq y_1 < y_2 \leq m$), then the set $E_k$ of pixels corresponding to the k-th rectangle is simply expressed by the formula $\{P_{i,j}\}_{i\in[x_1;x_2],j\in[y_1;y_2]}$ ; and by denoting $\mathcal{C}(E_k)$ the set of coordinates of the pixels of $E_k$ we have $\mathcal{C}(E_k)=\{(i,j)\}_{i\in[x_1;x_2],j\in[y_1;y_2]}$. The union E=∪$E_k$ is used of the sets of pixels associated with at least one rectangle.

Each rectangle defining an area to be blacked-out from the original document is then:

either directly selected by the user by means of the interface 13, for example by clicking on the two opposite angles or by dragging and expanding a reference rectangle. Step (a) then comprises the determination of the values of said four parameters defining the selected rectangle (using conventional graphical interface tools).

or indirectly selected: a chain of characters to be blacked-out from the original document is selected by the user by means of the interface 13 (e.g. by typing thereof). Step (a) comprises the determination of the values of said four parameters of the rectangle(s) of the image required to cover said selected chain of characters. More specifically, via Optical Character Recognition (OCR), the data processing means 11 determine the occurrences of this chain of characters, and for each occurrence identify the position of the associated rectangle(s) (e.g. if there are several lines), and infer therefrom the values of the four parameters for each of these rectangles in the same manner as if the user has selected these directly.

It is to be noted that the two methods can be used for one same document to select various areas to be blacked-out. It will be understood that the present invention is in no way limited to this selection method or even to the rectangles. For example, it can be envisaged that the user possesses a "brush" tool that is moved over the image selecting the desired pixels therein by press clicking.

At step (b), the data processing means generate a final document corresponding to the original document in which the vectors defining the pixels of said selected set are replaced by an arbitrary vector. This amounts to deleting the areas to be blacked-out since the varied pixels inside these areas are replaced by a single type of pixel, in other words the area becomes uniform. The areas are therefore illegible and devoid of information as desired by the user.

If the document is a black and white document (pixels defined by a single numerical value), this arbitrary vector is {0} for example, i.e. the black pixel. This therefore amounts to "blackening" the areas to be blacked-out, as could be done by hand. It will be fully understood that other colors are possible.

At a main step (c), the processing means 11 generate a zero-knowledge proof of the fact that the pixel matrixes of the original document and of the final document only differ via the pixels belonging to said selected set.

More specifically, said zero-knowledge proof guarantees the assertion: "given the coordinates of the areas to be blacked-out and the final image, there exists a document which only differs from the final document via these areas". In other words, if E is said corresponding set of pixels, and if $P^I_{i,j}$ and $P^F_{i,j}$ are the pixels of the initial and final images respectively:

$$\forall i,j \in [\![1;n]\!] \times [\![1;m]\!], \ P^I_{i,j} \neq P^F_{i,j} \Rightarrow (i,j) \in \mathcal{C}\ (E).$$

It is to be noted that the reverse is not necessarily true: a pixel of said set E will not be modified if it already has said arbitrary value (for example a black pixel if redacting entails blackening). In other words, if $\lambda$ is said arbitrary vector:

$$\forall i,j \in \mathcal{C}\ (E), P^I_{i,j} = \lambda \Rightarrow P^F_{i,j} = P^I_{i,j}$$

In the preferred embodiment in which the original document is associated with a condensate obtained by a given hashing function, said zero-knowledge proof generated at step (c) is preferably also proof of the fact that said condensate is indeed the result of application of said given hashing function to the original document.

Said zero-knowledge proof guarantees the following complete assertion: "given the coordinates of the blacked-out areas, the final image and the condensate of an original document, there exists a document the condensate of which corresponds to the one provided which only differs from the final image via these areas".

After step (c) we obtain:
the final document;
advantageously, the condensate of the original document preferably signed by the issuer;
proof (of constant size) that the modification has been properly performed and on the original document.

These elements can be given to the user at step (d), or directly transmitted to a third party such as the second server 10b.

Therefore, the final document can be related to the original document but it is not possible to obtain knowledge of the information that was included in the blacked-out areas. The cryptographic protocol gives proof that is rapid to verify (less than half a second) and that cannot be falsified: it is near-impossible (probability lower than $\frac{1}{2}^{80}$, even lower than $\frac{1}{2}^{128}$ depending on the parameters chosen to perform proof, which may then be slower to produce) to obtain acceptance of proof of the above assertion if the process did not take place in accordance with specified procedure.

When performing proof, the prover uses the possibility of producing zero-knowledge proof to hide the original document. Therefore, the proof does not give any information on the document itself, other than that the result of modification is related to this document.

For an honest prover who has not made any modifications to the document other than the blacked-out areas, the difference between the matrix of the final image and the matrix of the original image must comprise zeros everywhere except perhaps in a blacked-out area. In the blacked-out area, if pixels are defined by a vector equal to the arbitrarily chosen vector, the difference will also be zero. Elsewhere, it is tested whether the difference is zero.

A dishonest prover could attempt to produce a false administrative document from an original by taking advantage for example of the possibility of masking fields in the document to obtain an administrative document that is not in their name.

Protection is provided against this type of prover by imposing in the preferred embodiment that the proof contains verification of the condensate of the original document. Therefore, the proof contains the fact that the original (private) document has a condensate that is the (public) value provided at the input to the method. By choosing a hashing function well adapted to passing through arithmetic circuits (rather than a hashing function standardized by the NIST such as SHA256), this verification is able to be non-dominant during the proof computing time.

Therefore, said given hashing function is preferably selected from among a set of hashing functions allowing the preserved efficacy of performing of the proof, the preferred choice—in the light of the current state of the art—being a hashing function based on the subset sum The adapted hashing functions are effectively those that are particularly based on subset sums, also called of arithmetic type, since the arithmetic circuit representing the function has fewer multiplication gates. Examples are described in the publication: "O. Goldreich, S. Goldwasser and S. Halevi. Collision-free hashing from lattice problems. Technical report, 1996".

These functions were used in zkSNARKs and described in the publication "E. Ben-Sasson, A. Chiesa, E. Tromer and M. Virza. Scalable Zero-Knowledge via Cycles of Elliptic Curves. CRYPTO 2014".

If the entity which provided the original document and the condensate has signed the latter, verification of the signature allows the guarantee to be obtained that the condensate of the document is authentic, thereby obtaining absolute certainty that the final document has not been falsified.

Step (c) can be conducted in numerous manners, but preferably said zero-knowledge proof is a cryptographic object of zk-SNARK type.

zkSNARK stands for: "zero-knowledge Succinct Non Interactive ARgument of Knowledge". It is a cryptographic primitive constructed around the notion of proof. Researchers in theoretical computing and cryptography have long turned their attention to the notion of proof. There exist theoretical results with which it is possible to produce very short, secure proof of an algorithm, but the time needed to perform this proof is out of reach and will remain so despite increases in computing power. One of the reasons is related to the power given to the entity performing the proof: the prover. In theoretical results on proofs, the prover has infinite computing power and, in spite of this, proofs remain secure.

The notion of proof was then relaxed, the protocol only seeking protection from a prover having extensive but limited computing power. The result of the protocol is no longer proof but an argument. It is on the basis of this notion of argument that practical, verifiable computing systems have been constructed. One additional requirement in a system producing an argument is that this argument should be non-interactive: the verifier and the prover do not need to interact to produce the argument.

Since 2010, SNARKs have been presented: these are arguments of short size (a few elements of an elliptical curve), which do not require interactivity and which in addition enable the prover to perform zero-knowledge proof i.e. the proof does not contain any nontrivial information on the inputs provided by the prover.

There are several protocols which effectively perform zk-SNARKs, and persons skilled in the art are able to use these indifferently in the present method:
The Pinocchio protocol already mentioned;
The Gepetto protocol, presented in the publication: "Craig Costello, Cedric Fournet, Jon Howell, Markulf Kohlweiss, Benjamin Kreuter, Michael Naehrig, Bryan Parno, and Samee Zahur, Geppetto: Versatile Verifiable Computation, in Proceedings of the IEEE Symposium on Security and Privacy, IEEE, 18 May 2015", which is an improvement on Pinocchio The protocol presented in the publication: "Michael Backes, Manuel Barbosa, Dario Fiore, Raphael Reischuk. ADSNARK: Nearly Practical and Privacy-Preserving Proofs on Authenticated Data. In Proceeding of the IEEE Symposium on Security and Privacy, 18 May 2015" which produces SNARKs on authenticated data called ADSNARKs.

The protocol presented in the publication et seq.: "Eli Ben-Sasson, Alessandro Chiesa, Daniel Genkin, Eran Tromer, Madars Virza. SNARKs for C: Verifying Program Executions Succinctly and in Zero Knowledge. In Proceedings of the 33rd Annual International Cryptology Conference, CRYPTO '13, pages 90-108, 2013", implemented in open-source in the form of a library called libsnark, optimising the protocol producing a zkSNARK in Pinocchio by improving the expressivity thereof i.e. the type of program or algorithm it is possible to verify.

To take the example of the Pinocchio protocol, this protocol comprises several parts:

1. A conventional program is translated into the form of an arithmetic circuit i.e. a set of relations between the inputs and outputs of the program, translated solely using additions and multiplications of elements of a finite body. It is to be noted that all programs, in theory, may be translated into this form, but only one part of these programs allows efficient translation into circuit form.

2. The arithmetic circuit obtained is efficiently represented by means of three families of polynomials to which an additional polynomial is added called a target polynomial. These families of polynomials form "Quadratic Arithmetic Programs" (QAPs). They encode the relations between the inputs and outputs of each multiplication gate of the circuit, the relations of the addition gates being integrated in the first following multiplication gate of the computation.

These QAPs are related to the verifiable computation by the following point: a computation $y=C(x)$ is correct for an input x if and only if all the relations describing the corresponding arithmetic circuit are satisfied by fixing x as input value and y as output value.

In a sense, QAPs allow the compression of all the constraints to be verified into a single relation to be verified: a polynomial constructed from value x and the three QAP families must divide the target polynomial.

3. A cryptographic protocol therefore takes a QAP as input that is associated with a program, generates evaluation and verification keys which use elliptical curves to hide the polynomial relations. The polynomial proving that computation has been correctly performed is then computed directly using the relations hidden in the elliptical curve. The relation of divisibility is translated solely by means of a constant number of elements in the elliptical curve i.e. the proof is of constant size. Verification of this proof is extremely quick.

Additionally, the protocol makes it possible for some computational inputs provided by the prover to be private: it allows hiding of the values of the prover in performance of the proof, by multiplication thereof by a multiple of the target polynomial, which does not modify the fact that the "proof" polynomial is divisible by the target polynomial.

This "proof" polynomial, when hidden in an elliptical curve, consists of a zk-SNARK.

Verification Method

In a second aspect, the method is proposed for verifying the authenticity of a final document obtained, or at least allegedly obtained, by implementing a redacting method according to the first aspect on an original document. In other words, it is a method for verifying the authenticity of a redacted document (that is potentially suspect on account of modified areas). With this method it is possible to prove that only removal of information has been performed on the original document, and no falsification.

As explained, this method simply sets itself apart in that the final document received from equipment 1 via the network 2 for example, is associated with said zero-knowledge proof due to the fact that the pixel matrixes of the original document and of the final document only differ via the pixels belonging to said selected set, in other words due to the fact that the pixel matrixes of the original document and of the final document only differ via identical (black) pixels in the blacked-out areas. This means, in the contra-positive, that any pixel outside said areas is identical in the original document and in the final document, hence the authenticity.

This method only comprises the implementation of a step, by data processing means 11b of the (second) server 10b (acting as verifier), to verify that said zero-knowledge proof is valid.

As explained, this verification is not interactive (the verifier does not need to contact the prover) and takes place simply in constant time by verifying that the proof is authentic, which demonstrates to the server 10b (to within the most infinitesimal probability) that the alleged property is true i.e. that the entire final document, with the exception of the blacked-out areas, is identical to the original document. It is therefore convinced that the provided document is not a false document in spite of these areas.

Therefore, once proof has been verified, the final document is considered to be authentic.

If the final document is further associated with a condensate of the original document obtained by a given hashing function, said zero-knowledge proof is then also proof of the fact that said condensate is indeed the result of application of the said given hashing function to the original document, and this second property is guaranteed true once the proof has been determined to be valid (in other words, the proof is only valid if the two propositions are simultaneously true). The server 10b therefore knows that an original document has been sent to equipment 1, that its condensate has been verified and that it corresponds to the provided condensate.

If said condensate is signed by an issuing body of the original document, the verification method further comprises a step to verify the validity of said signature so as to guarantee that no security shortfall is possible.

Computer Program Product

In a third and a fourth aspects, the invention concerns a computer program product comprising code instructions (in particular on the data processing means 11, 11b of equipment 1 or of the second server 10b) for execution of a method according to the first aspect of the invention for redacting an original document, or a method according to the second aspect of the invention for verifying the authenticity of a final document, and storage means readable by computer equipment (a memory of equipment 1 or of the second server 10b) on which this computer program product is installed.

The invention claimed is:
1. A method for redacting an original document including a matrix of pixels each defined by a vector having at least one numerical value, the method comprising implementation by a data processor the steps of:

(a) determining a set of pixels of said matrix corresponding to one or more areas to be blacked-out from the original document;
(b) generating a final document corresponding to the original document in which the vectors defining the pixels of said selected set are replaced by an arbitrary vector;
(c) generating a zero-knowledge proof of the fact that the pixel matrixes of the original document and of the final document only differ via pixels belonging to said selected set, wherein the generated zero-knowledge proof is a cryptographic object which guarantees that $\forall i,j \in [[1;n]] \times [[1;m]], P^I_{i,j} \neq P^F_{i,j} \Rightarrow (i;j) \in \mathcal{E}$ (E), where E represents the one or more blacked-out areas, and $P^I_{i,j}$ and $P^F_{i,j}$ are the pixels of the original and final documents respectively.

2. The method according to claim 1, wherein the original document is associated with a condensate obtained by a given hashing function, said zero-knowledge proof generated at step (c) also being proof of the fact that said condensate is indeed the result of application of said given hashing function to the original document.

3. The method according to claim 2, wherein the original document and said condensate are provided by an issuing body, the method further comprising prior verification, by said data processing means, that said condensate is indeed the result of application of said given hashing function to the original document.

4. The method according to claim 3, wherein said condensate is signed by said issuing body.

5. The method according to claim 1, wherein step (a) comprises the prior definition of each area to be blacked-out from the original document in the form of a planar geometric figure, said set of pixels corresponding to one or more areas to be blacked-out from the original document being determined as the set of pixels of the matrix included in at least one of said planar geometric shapes.

6. The method according to claim 5, wherein said planar geometric shapes are rectangles each defined by four parameters.

7. The method according to claim 6, wherein at least one rectangle defining an area to be blacked-out from the original document is directly selected by the user by means of an interface of the equipment, step (a) comprising the determination of the values of said four parameters defining the selected rectangle.

8. The method according to claim 6, wherein a chain of characters to be blacked-out from the original document is selected by the user by means of an interface of the equipment, step (a) comprising the determination of the values of said four parameters of the rectangle(s) of the image required to cover said selected chain of characters.

9. The method according to claim 1, wherein the zero-knowledge proof generated at step (c) is a cryptographic object of zkSNARK type.

10. The method according to claim 1, wherein said given hashing function is a hashing function based on the subset sum allowing preservation of the efficacy of proof generation.

11. A method for verifying the authenticity of a final document obtained by implementing on an original document a redacting method according to claim 1, the final document being associated with said zero-knowledge proof of the fact that the pixel matrixes of the original document and of the final document only differ via pixels belonging to said selected set, the method comprising the implementation, by data processing means of a server, of a step to verify that said zero-knowledge proof is valid.

12. The method according to claim 11, wherein the final document is further associated with a condensate of the original document obtained by a given hashing function, said zero-knowledge proof also being proof of the fact that said condensate is indeed the result of application of said given hashing function to the original document.

13. The method according to claim 12, wherein said condensate is signed by an issuing body of the original document, the method further comprising a step to verify the validity of said signature.

14. A non-transitory computer readable medium comprising code instructions to execute a method according to claim 1 for redacting an original document or for verifying the authenticity of a final document.

* * * * *